Dec. 12, 1933.  G. F. RUOPP  1,939,466
FLUID PRESSURE GAUGE
Filed July 6, 1931
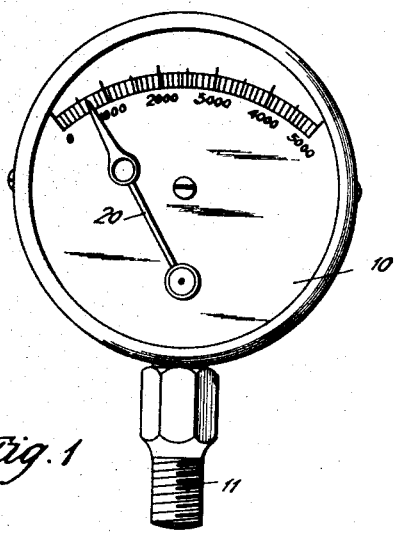
Fig. 1
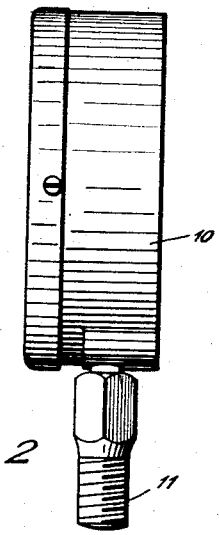
Fig. 2
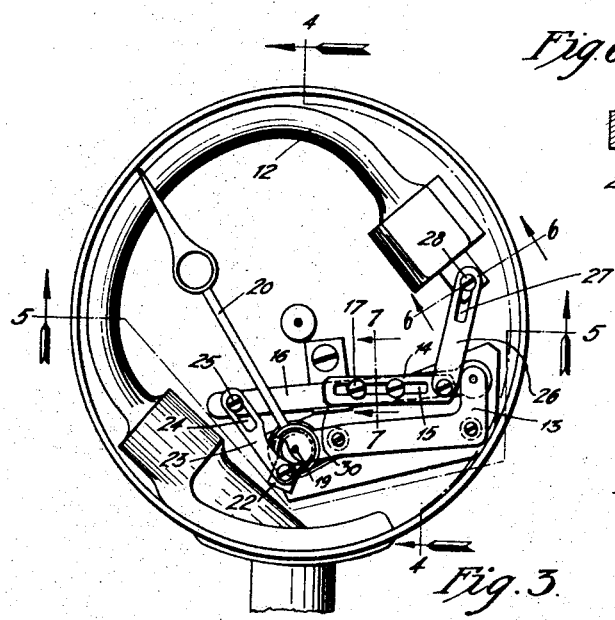
Fig. 3
Fig. 6
Fig. 7
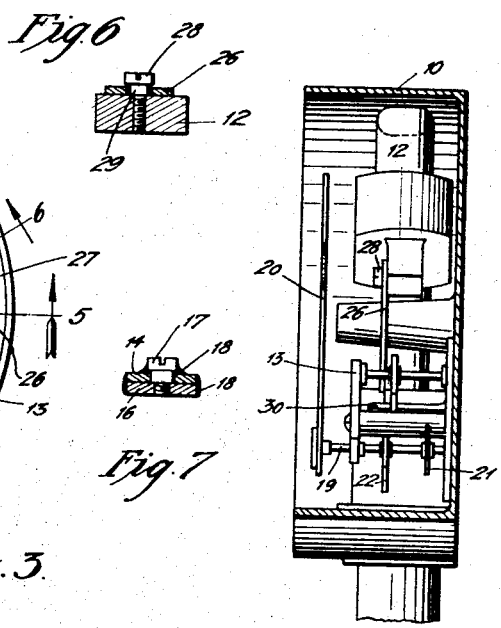
Fig. 4
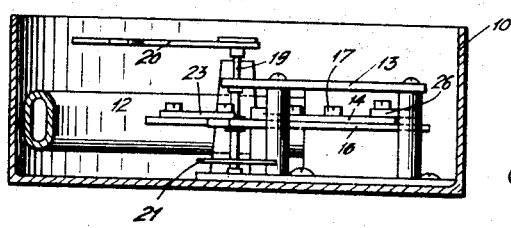
Fig. 5
Inventor
George F. Ruopp
by Onwig & Hague Attys.

Patented Dec. 12, 1933

1,939,466

UNITED STATES PATENT OFFICE 1,939,466

FLUID PRESSURE GAUGE

George Frederick Ruopp, Marshalltown, Iowa, assignor to Marshalltown Manufacturing Company, Marshalltown, Iowa, a corporation of Iowa Application July 6, 1931. Serial No. 548,766

3 Claims. (Cl. 73—109)

My invention relates to that class of pressure gauges which employs the Bourdon tube, and is particularly designed for use in connection with relatively high pressure gauges which are subjected to rapid pressure changes.

My object is to provide a gauge of this character in which the Bourdon tube is relatively large and sturdy in construction to withstand high pressure, and to provide means for minimizing the effect of rapid vibrations of the Bourdon tube as applied to the indicating arm and associated parts, to thereby prevent such vibration from injuring or rapidly breaking down the indicator arm and its associated parts.

My invention consists in the construction, arrangement and combination of the various parts of the device, whereby the objects contemplated are attained, as hereinafter more fully set forth, pointed out in my claims, and illustrated in the accompanying drawing, in which:

Figure 1 shows a front elevation of a pressure gauge embodying my invention.

Figure 2 shows a side elevation of same.

Figure 3 shows a front elevation of same with the dial removed to show the operating mechanism.

Figure 4 shows a central sectional view of the gauge frame to show the interior construction, taken on the line 4—4 of Figure 3.

Figure 5 shows a sectional view on the line 5—5 of Figure 3.

Figure 6 shows a sectional view on the line 6—6 of Figure 3; and

Figure 7 shows a sectional view on the line 7—7 of Figure 3.

Referring to the accompanying drawing, I have used the reference numeral 10 to indicate generally the gauge casing having a pipe 11 in its lower end, through which the fluid pressure for operating the gauge is introduced.

On the interior of the gauge is a Bourdon tube 12 communicating with the pipe 11. This Bourdon tube is intended for use in connection with liquids or air under relatively high pressures, and it is, therefore, made relatively large and sturdy in construction, and its free end is moved a relatively slight distance on account of the differences in pressure.

Mounted within the casing 10 is a frame 13 to which there is pivoted a lever 14 containing a slot 15. This lever is provided with an extension member 16 adjustably connected with the member 14 by screws 17 through the slot 15, and by this means the length of the lever may be adjusted and when so adjusted I preferably apply solder to hold the two parts of the lever against further movement, as indicated at 18 in Figure 7.

Mounted within the frame 13 is an upright shaft 19 having mounted on its upper end the indicator arm 20, and at the lower end of the shaft 19 is a convolute spring 21 for normally holding the indicator arm toward its low pressure position.

Fixed to the shaft 19 is an arm 22 and pivoted to this arm 22 is a link 23 formed with a slot 24 and extended through this slot is a screw 25 seated in the outer end of the lever 16.

Pivotally connected to the lever 14 near its pivot point is another link 26 formed with a slot 27. A screw 28 extends through this slot and is seated in the free end of the Bourdon tube. This screw is preferably provided with a shoulder at 29, as shown in Figure 6, which limits the movement of the screw into the Bourdon tube 12, so that the link 26 is free to slide relative to the Bourdon tube through the length of the slot 27. The screw 25 is similarly constructed, so that there is no binding of the screws 25 and 28 upon their respective links 23 and 26.

A stop device 30 is secured to the casing and extended to position to engage the lever 16 and limit its movement in one direction.

In practical use, and assuming that relatively high hydraulic pressures are applied to the Bourdon tube, and that these pressures vary at considerable rapidity, then during the expanding movement of the Bourdon tube, motion is transmitted to the lever 16 by the link 26, and from the lever 16 by the link 23 to the arm 22, which operates the indicator arm. When, however, the Bourdon tube vibrates in the opposite direction, the screw 28 slides through the slot 27, and likewise the screw 25 slides through the slot 24 without affecting the indicator arm, which is moved in the direction toward the low pressure side of the instrument only by the spring 21.

By this means the excessive shocks and jars, to which the indicator arm and its associated parts would ordinarily be subjected by the rapid vibrating movement of the Bourdon tube, are substantially eliminated as applied to the indicator arm and its associated parts, and hence the gauge is relatively long lived and not subjected to rapid breaking down or wearing out on account of such excessive vibration.

By forming the lever 14 and 16 of two parts adjustably connected, the operator may adjust the length of the lever by the set screws 17 until the indicator arm correctly indicates the pressures in correspondence with the scale marked upon the gauge, and when this point has been reached, the screws 17 are set and solder is applied to the screws and the overlapping members of the lever, thus permanently fixing these parts in their correctly adjusted position and preventing vibration applied to the lever from affecting this adjustment.

Furthermore, by having the lever 14 and 16 of relatively great length and by connecting the link 26 with the lever near its pivot end, and the link 23 with the lever near its free end, the movement of the Bourdon tube as applied to the indicator arm is greatly magnified, so that a relatively sturdy Bourdon tube may be employed, which moves only slight distances, and yet will move the indicator arm through a relatively long path of movement throughout the entire length of the scale marked upon the indicator.

I claim as my invention:

1. A pressure gauge comprising a Bourdon tube, an indicator arm and means for transmitting motion to the indicator arm, said means comprising a shaft for the indicator arm, a lever, a link pivoted to the lever near its fulcrum and pivoted to the Bourdon tube, said link having a limited sliding movement at one end whereby contracting movements of the Bourdon tube will not be transmitted to the lever, means for connecting the lever to the indicator arm, comprising a link having a limited sliding connection at one end, and a spring for normally holding the indicator arm toward its low pressure position, said lever being formed of two parts adjustably clamped together.

2. A pressure gauge comprising a Bourdon tube, a rotatable shaft, an indicator arm fixed to the rotatable shaft, a spring for normally holding the shaft and indicator arm toward the low pressure side of the gauge, an arm fixed to the indicator shaft, a link pivoted to said arm and having a slot at its other end, a lever pivoted within the gauge, a screw extended through said slot and seated in the outer end of said lever arranged to permit free movement of the lever relative to the link, a second link pivoted to said lever near its fulcrum point and formed with a slot at its outer end, a screw extended through said slot and connected to the Bourdon tube, said lever being adjustable in length, substantially as and for the purposes stated.

3. A pressure gauge comprising a Bourdon tube, a rotatable shaft, an indicator fixed to said shaft, an arm fixed to said shaft, a lever, a link connecting the lever to the Bourdon tube, and a second link connecting the lever to said arm, said connections between the indicator shaft and the Bourdon tube including means whereby expanding movements of the Bourdon tube will be transmitted to the indicator shaft and contracting movements of the Bourdon tube will not be transmitted to the shaft, and a spring normally tending to return the indicator to its zero position.

GEORGE FREDERICK RUOPP.